(12) United States Patent
Sugimoto

(10) Patent No.: US 6,350,531 B1
(45) Date of Patent: Feb. 26, 2002

(54) BIODEGRADABLE PLASTIC MOLDED ARTICLE

(75) Inventor: Ichiro Sugimoto, Machida (JP)

(73) Assignee: Keiichi Sugimoto, Tokyo (JP)

( * ) Notice: Subject to any disclaimer, the term of this patent is extended or adjusted under 35 U.S.C. 154(b) by 0 days.

(21) Appl. No.: 09/622,755

(22) PCT Filed: Feb. 18, 1999

(86) PCT No.: PCT/JP99/00721

§ 371 Date: Oct. 30, 2000

§ 102(e) Date: Oct. 30, 2000

(87) PCT Pub. No.: WO99/42527

PCT Pub. Date: Aug. 26, 1999

(30) Foreign Application Priority Data

Feb. 23, 1998 (JP) .......................................... 10-040862

(51) Int. Cl.[7] .......................... B32B 15/00; C08L 89/04
(52) U.S. Cl. ............................ 428/533; 524/9; 524/13; 524/14; 524/58; 524/86; 524/127; 428/402
(58) Field of Search .............................. 524/9, 13, 14, 524/58, 86, 127; 428/402, 533

(56) References Cited

U.S. PATENT DOCUMENTS 5,817,381 A * 10/1998 Chen et al. ................. 428/34.8
6,029,395 A *  2/2000 Morgan ........................... 47/9
6,083,582 A *  7/2000 Chen et al. ................. 428/34.8

FOREIGN PATENT DOCUMENTS

EP          0786 496         7/1997

* cited by examiner

*Primary Examiner*—Samuel A. Acquah
(74) *Attorney, Agent, or Firm*—Kilpatrick Stockton LLP

(57) ABSTRACT

A biodegradable plastic article molded of a mixture comprising the following components:
   (A) a biodegradable plastic at 98 to 59% by weight,
   (B) a dry powder of a water-swelling fiber at 1 to 40% by weight, and
   (C) a fertilizer powder at 1 to 40% by weight
(wherein the sum of (B) and (C) is from 2 to 41% by weight). This biodegradable plastic article can improve biodegradability of the biodegradable plastics and make it possible to regulate the rate of biodegradation thereof.

10 Claims, 1 Drawing Sheet

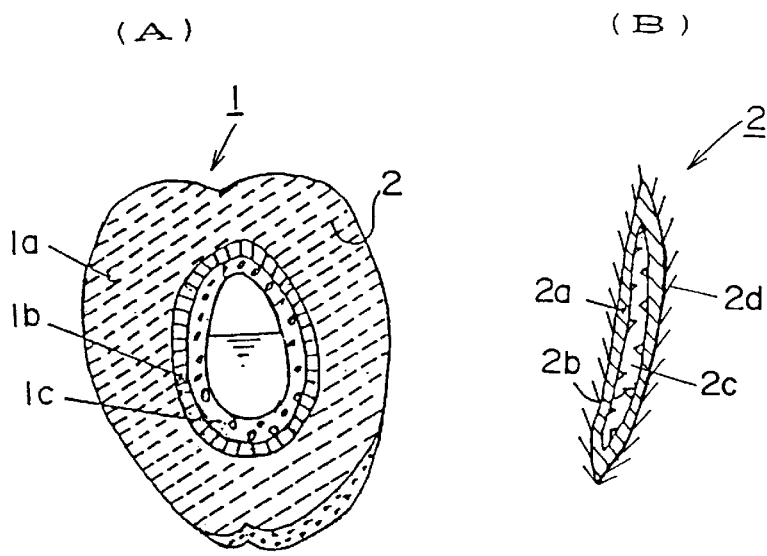
F I G. 1
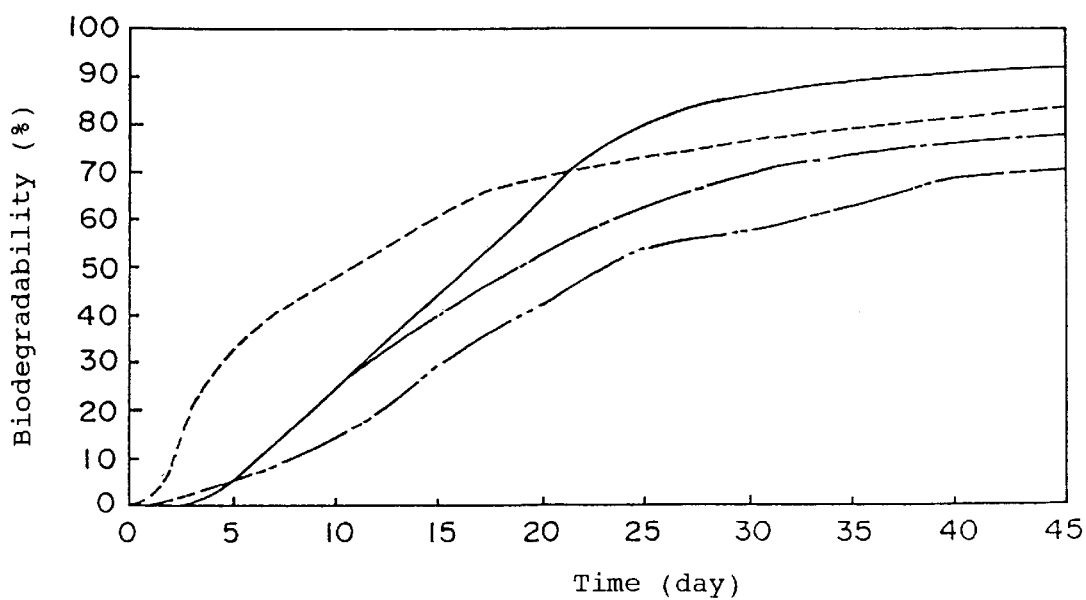
F I G. 2

BIODEGRADABLE PLASTIC MOLDED ARTICLE

DESCRIPTION

1. Technical Field

The present invention relates to a biodegradable plastic molded article and more particularly to a biodegradable plastic molded article with a high biodegradation rate.

2. Background Art

The demand for biodegradable plastics which degrade in the environment increases due to environmental problems faced by the society. Biodegradable plastics which have already been developed are classified into the following four categories, which partially overlap each other.

(a) naturally-occurring polymers consisting of polysaccharides such as starch, (b) microbial polyesters using the biological activities of microorganisms (polyhydroxyalkanoates and the like), (c) usual plastics added with degradation accelerators, that is, mixtures having accelerated degradation characteristics, and (d) chemosynthetic compounds including aliphatic polyesters and the like.

The biodegradable plastics have been used as raw materials for throw-away articles or used for articles which do not need to usually carry heavy loads based on the individual characteristics of these different materials. Examples of the above-mentioned application include agricultural articles such as films, sheets, fastening screws, planting pots, and sacks; daily necessities and table wares such as trays, cases, and straws; certain medical articles; and sporting goods. However, applicability of the biodegradable plastics is still restrictive. The influence thereof on the overall plastic industry is also restricted.

The review of "the present state of technology" concerning macromolecules which degrade in the environment is shown in "Encyclopedia of Chemical Technology, the fourth edition" Vol. 19, 968–1004, published by John Wiley and Sons Corporation, 1996. The above whole teaching is hereby incorporated into the present description by reference. In addition, the review of the manufacturing method and the test method utilized at present is shown in "Encyclopedia of Chemical Technology, the fourth edition" Vol. 19, 290–347, published by John Wiley and Sons Corporation, 1996. The above whole teaching is hereby incorporated into the present description by reference.

Although the biodegradable plastics are generally full of promise to solve the plastic disposal problems, there are also some difficulties. A biodegradation rate may be slower than the expected rate due to kinds and ratios of biodegradable plastic contents and also due to differences of the environment where the biodegradable plastics are disposed. In addition, another problem is that when a thickness of molded articles including biodegradable plastics increases, the biodegradability thereof reduces. Furthermore, the life of the molded articles including the biodegradable plastics may be shorten compared with the desired life due to insect pests. Further serious problems are that functions thereof are limited to optimally narrow objectives, or a large part of the macromolecules thereof are specially prepared so as to act certain parts during a manufacturing step. Partially degradable plastics including non-biodegradable plastics have not satisfactory quality. Therefore, improvement in biodegradability of all plastics with maintaining benefic characteristics of each biodegradable plastic is remarkably useful.

A method for achieving this object is using additives which make plastics to be easily degraded in the environment instead of fillers which are usually used now. At present, the additives to plastics are employed in order to give favorable characteristics to the plastics. For example, additives are used for giving characteristics such as strength, hardness, flexibility, and color.

The review concerning characteristics, application, and toxicity of the additives to plastics in detail is shown in "Chemical Additives for the Plastics Industry", published by Radian Corporation and Noyes Data Corporation, N.J., U.S.A., 1987. The above whole teaching is hereby incorporated into the present description by reference.

One candidate which improves the degradability in the environment of the additives to the plastics is biomaterials such as plant fibers and wood powders. Since the plant fibers alone and wood powders include lignin (phenolic polymer) and have repellent nature to insects, these utilization reduces biodegradability.

In contrast, the inventors of the present invention have found that when the dry powders of the fibers included in coconut mesocarp are mixed with biodegradable plastics, the biodegradability thereof can be increased (JP-A-9-263700).

DISCLOSURE OF THE INVENTION

An object of the present invention is to provide a biodegradable plastic molded article having further superior biodegradability to the conventional art.

Another object of the present invention is to accelerate the biodegradability of the conventional biodegradable plastics preferably without deteriorating the processing characteristics such as good molding, extrusion, blow molding, foam molding, inflation molding and other molding methods.

Still another object of the present invention is to further improve the biodegradability of the conventional biodegradable plastics, and simultaneously to allow controlling a biodegradation rate of the biodegradable plastic molded articles.

To address the above-described problems, the inventors of the present invention performed careful examinations. As a result, the inventors of the present invention have found that when dry powders of water-swelling fibers and fertilizer powders are mixed with biodegradable plastics, the biodegradability thereof can be accelerated, so that the present invention has been completed That is, an aspect of the present invention is a biodegradable plastic article molded of a mixture including the following components:

(A) biodegradable plastics at 98 to 59% by weight, (B) a dry powder of a water-swelling fiber at 1 to 40% by weight, and (C) fertilizer powder at 1 to 40% by weight (wherein the sum of (B) and (C) is from 2 to 41% by weight).

In one embodiment, the present invention includes a biodegradable plastic molded article, wherein the dry powders of the water-swelling fibers include dry powders of coconut mesocarp fiber residues.

In another embodiment, the present invention includes a biodegradable plastic molded article, wherein the dry powders of the coconut mesocarp fibers residues are obtained by drying the fiber residues to a water content of about 10% by weight in which the residues are derived from a fiber components of the coconut mesocarp and contaminants including salts and tannin are essentially removed, by compressing into powders having a particle diameter ranging from 1 to 80 micron, and by drying to a water content of less than 3% by weight.

In still another embodiment, the present invention includes a biodegradable plastic molded article, wherein the biodegradable plastic is selected form the group consisting of aliphatic polyesters, macromolecular polysaccharides, and microbial polyesters.

In still another embodiment, the present invention includes a biodegradable plastic molded article, wherein the fertilizer is selected form the group consisting of nitrogenous fertilizers, phosphate fertilizers, potassium fertilizers, and fertilizers including diatomaceous.

Another aspect of the present invention is a biodegradable plastic article molded of a mixture including the following components:

(A) biodegradable plastics at 97 to 58% by weight,
(B) dry powders of water-swelling fibers at 1 to 40% by weight,
(C) fertilizer powders at 1 to 40% by weight, and
(D) a component selected form the group consisting of surfactants, stains, and agricultural chemicals at 1 to 10% by weight (wherein the sum of (B), (C), and (D) is from 3 to 42% by weight).

The present invention will be described in detail below.

The biodegradable plastic molded articles in accordance with the present invention show accelerated biodegradability by mixing dry powders of water-swelling fibers and fertilizer powders with biodegradable plastics. In addition, the adjustment of the mixed composition can control a degradation rate.

First, the components of the biodegradable plastic molded articles in accordance with the present invention will be described.

<1> components of the biodegradable plastic molded articles in accordance with the present invention (1) Biodegradable plastics ((A) component)

Any biodegradable plastics can be employed in the present invention as long as the plastics are degraded in the environment, especially in plastics degraded by microorganism activities.

Concrete examples of the above-mentioned biodegradable plastics are macromolecular polysaccharides, microbial polyesters, aliphatic polyesters, and the like as described in (a), (b), and (d) in the background art. More concrete examples are polylactic acid; polyhydroxyalkanoate (for example, poly(3-hydroxybutyric acid)(PHB), poly(3-hydroxyvaleric acid)(PHV)); lactone resins; polyester resins obtained from a low molecular weight aliphatic dicarboxylic acid and a low molecular weight aliphatic diol; complexes based on cellulose acetate, polycaprolactone, and the like; and complexes such as denatured starch-modified polyvinyl alcohol, other complexes, or the like.

The above-described biodegradable plastics are compounded into a raw material mixture of biodegradable plastic molded articles at 98 to 58% by weight in the present invention. The above-mentioned compounding amount can be adjustable by adding optional components without sacrificing the advantages of the present invention.

(2) Dry powders of water-swelling fibers ((B) component)

The dry powders of water-swelling fibers used in the present invention are fibrous powders in which the volume thereof increases compared with that in a dry state, when water is added thereto. The powders are not restricted, as long as they have the above-mentioned characteristic, do not adversely affect the biodegradability thereof, and are tolerable to plastic molding. Preferably, the powders themselves have biodegradability. Example of the dry powders of water-swelling fibers is preferably dry powders of a coconut mesocarp fiber residues (hereafter referred to as a "coconut powder"). More preferably, the dry powders of water-swelling fibers is obtained by drying the fiber residues to a water content of about 10% by weight in which the residues are derived from a fiber component of the coconut mesocarp and a contaminant including a salt and a tannin is essentially removed, by compressing into a powder having a particle diameter ranging from one to 80 micron, and by drying to a water content of less than 3% by weight.

Cocos nucifera is a plant classified among Palmales and is widely cultivated in tropical regions. Its fruit (coconut) is utilized in many ways. According to FIG. 1 (A) showing a longitudinal sectional view of a coconut 1, an albumen 1c which is usually used as coconut oil, foods, or drug materials and typically has a thickness ranging from 10 to 20 mm is seen in the sidecoconut 1. Usually, a hard wooden mesocarp 1b known as an investment has a thickness ranging from 2 to 6 mm. The investment of the coconut is useful for manufacturing industrial grade and high quality activated carbon. A mesocarp 1a called parisarc forms largest region of the coconut and has a typical thickness ranging from 30 to 40 mm. The fibers 2 in the mescarp are mostly used for manufacturing strings, nets, mats, and ropes at present. Although the fiber residues which are generated during manufacturing above are processed into compressed potting compost and used for soil improvement, they are not usually used for other purposes.

The coconut fibers 2 obtained from the mesocarp 1a is botanically classified among a sclerenchymatous fiber. According to FIG. 1 (B) showing an enlarged cross-sectional view of the coconut fiber 2, the coconut fiber 2 is found to constructionally include a lumen membrane 2a, a saw tooth trichome 2b, a hollow foramen 2c, and a beard like twig 2d. Usually, the length of the beard like twig 2d of the coconut fiber 2 are about 0.7 mm, and the width thereof is about 20 $\mu$m. Physically, the coconut fibers are light, hard, and elastic. In addition, the coconut fiber is a low thermal conductor, and is resistant to water and air (inorganic and organic industrial material handbook, first edition; p788 written by Shoichiro Nagai, published by Toyo Keizai News, Inc., Mar. 20, 1960). The above whole teaching is hereby incorporated into the present description by reference.

The term "a coconut mesocarp fiber residue" used in the present description means a concept nonrestrictively including coconut fiber fine fragments obtained by finely fragmentizing the above-described coconut fiber 2. Concrete example of this coconut mesocarp fiber residues are fiber residues obtained during manufacturing the above-mentioned coconut fiber products and the like. Furthermore, the coconut mesocarp fiber residues include fine fragments which remain cross-sectional forms shown in FIG. 1 (B), beard like twigs 2d detached from the coconut fiber 2, lumen membrane 2a fragments, and the like.

The dry powders of a coconut mesocarp fiber residues (coconut powders) used in the present invention are obtained by drying and fragmentizing the above-described coconut mesocarp fiber residues. The method of manufacturing thereof is not particularly restricted, and for example, the powder can be produced as follows.

That is, in order to obtain the coconut powder, the coconut mesocarp is exposed to freshwater for 10 to 16 months so as to dissolve pulpy substances and only fibers are collected. The obtained fibers are exposed to sunlight for about not less than two years so as to remove salts and tannin included therein. Then, an artificial drying with hot air is conducted for about eight hours so as to reduce a water content to about 10% by weight, so that fine fragments of fibers, namely the coconut mesocarp fiber residues are obtained. The residues are compressed with a pressing machine or the like to a compression ratio ranging from 4 to 6:1, and then subjected to a crusher such as a ball mill, hammer mill, and jet mill etc. so as to be crushed and made powders. Drying and removal of the salts and tannin may be conducted, after fine fragments of the fibers are obtained.

Although a size of the coconut powders is not particularly specified, the particle diameter preferably is set ranging from 1 to 80 $\mu$m based on the appearance of plastic molded articles including therein and an energy cost required for the crush etc.

Although a degree of dryness of the coconut powders is not particularly specified, the coconut powders are preferably dried so as to have a water content at less than 3% by weight in the present invention. Adjustment of the water content of the coconut powders may be conducted at a step for manufacturing the coconut mesocarp fiber residues so as to be less than 3% by weight. Preferably, the following method is employed as described above. That is, the water content is decreased to about 10% by weight at the step for manufacturing the coconut mesocarp fiber residues and the coconut mesocarp fiber residues are further dried in the step to manufacture the coconut powders therefrom so as to be less than 3% by weight. Usually, when the coconut powders are dried in the step to manufacture the coconut powders, hot air or the like is employed after the size of the coconut powders obtained with the above-described crush are adjusted using a screen and the like, if necessary.

The coconut powders produced with the above-described manufacturing method including a compression step have a characteristic that when water is added therein, the volume increases five to six times. Although the volume of the coconut mesocarp fibers residues becomes one fourth to one sixth due to compression, the compressed fiber residues memorize the form in the natural state. Therefore, this phenomenon is assumed to be caused by the same principle in which when water is added, the cells of the lumen membranes $2a$ recover in the natural state, so that compressed fiber residues recover in the initial form. In addition, this swelling characteristic assumes to significantly accelerate the degradation of biodegradable plastics. Furthermore, microorganisms seem to prefer the components of the coconut powders (cellulose component and the like).

The above-described dry powders of water-swelling fibers are compounded into a raw material mixture of biodegradable plastic molded articles in a ratio ranging from 1 to 40% by weight in the present invention. However, the compounding ratio can be appropriately adjusted depending on the amount of other compounding components. For example, the compounding ratio of the dry powders of water-swelling fibers together with the fertilizer powders (C), described later, is ranging from 2 to 41% by weight. In addition, in the case that the raw material mixture of the biodegradable plastic molded articles in accordance with the present invention are compounded with at least one component (D) selected from the group consisting of surfactants, stains, and agricultural chemicals, the sum amount of (c) and (D) is ranging from 3 to 42% by weight.

(3) Fertilizer powders ((C) component)

Fertilizer powders act as auxiliary agent to the growth of microorganisms which effect on biodegradable plastics and accelerate the degradation thereof. As long as the fertilizer powders have the above-mentioned characteristic, there is no limitation. Concretely, examples of the fertilizer powders used in the present invention are carbon sources, nitrogen sources, inorganic components, microdose nutrients, and the like which are usually used for medium for the microorganisms; and components used as fertilizer for plants and the like, optional mixtures of these components which take powdery forms, or those processed to take powdery forms, and the like.

Concrete examples of the above-described fertilizer components are nitrogenous fertilizers in which the main ingredient is a compound including nitrogen such as ammonium nitrate, urea, ammonium sulfate, ammonium chloride, and ammonium phosphate; phosphate fertilizers in which the main ingredient is a compound including phosphorous such as superphosphate and ammonium phosphate; potassium fertilizers in which the main ingredient is a compound including potassium such as potassium chloride and potassium sulfate; fertilizers including diatomaceous as the main ingredient; and the like. These fertilizer components may be used alone or in combination with two kinds or more.

In this description, a term "fertilizers including diatomaceous" is used for the above-mentioned fertilizers including diatomaceous as the main ingredient. Any diatomaceous obtained from marine sediment, mud flat sediment, or lacustrine sediment may be used as diatomaceous in the fertilizers including diatomaceous employed in the present invention. A diatomaceous field is not also especially restricted. Preferably, diatomaceous with high purity which substantially does not contain impurities such as sand, volcanic ash, clay substances, iron, alkaline salts, sulfuric acid, and animal and plant fossil except diatomaceous is employed.

A size of the fertilizer powders is not restricted. A particle diameter preferably is set ranging from 1 to 80 $\mu$m based on the appearance of plastic molded articles including therein and an energy cost required for the crush etc.

Most of the above-described fertilizer powders are commercially available as one component or fertilizer containing multi components compounded with a lot of components. These commercially available fertilizer powders can be utilized in the present invention.

When the above-described fertilizers are compounded into biodegradable plastics, the proliferation of microorganisms which involve in the biodegradation of plastics such as Pseudomonas are accelerated to cause the improvement of the biodegradation rate. In addition, since the diatomaceous is natural organic material, it seems to be useful to accelerate the biodegradability. Furthermore, the degradation rate can be adjusted depending on a kind or a compounded amount of the fertilizer powders.

The above-described fertilizer powders are compounded into the raw material mixture of biodegradable plastic molded articles at 1 to 40% by weight in the present invention. However, the above-mentioned compounding amount can be fitly adjustable by the compounding amount of other components as concretely described above item (2).

(4) Other components

In addition to the above-described components, other components may be optionally compound into the biodegradable plastic molded article in the present invention.

For example, since phytogenous pathogenic organisms prefer non-biodegradable plastics (petroleum polyesters) and the like, the non-biodegradable plastics may be added in order to adjust the degradation rate.

Furthermore, industry standard plastic additives can be added in order to obtain the desired characteristics. For example, surfactants may be added to improve workability, or stains such as a variety of pigments may be added to improve marketability. In addition, agricultural chemicals may be added in order to protect soil from insect pests, if necessary. The characteristics of the basic plastic materials can be modified by addition of polymerization regulators such as crosslinking agents, monomer derivatives, heteromonomers, curing agents.

In the present invention, among these optional components, at least one component ((D) component) selected from the group consisting of surfactants, stains, and agricultural chemicals is preferably compounded. The compounding amount of (D) components as the sum amount is usually ranging from 1 to 10% by weight.

Moreover, the well known antioxidants, carbon black (Ketzin carbon), inorganic fillers, slip additives, antiblocking agents and the like may be added. When these agents are added, the sum added amount thereof can be reduced from any one or more adding amount of the above-described items (A), (B), (C), and (D) without affecting the advantages of the present invention.

To increase dispersibility of coconut powders and fertilizer powders in the biodegradable plastic molded articles, the coconut powders and/or the fertilizer powders can be subjected to surface treating with coupling agents such as silane.

<2> Methods of manufacturing the biodegradable plastic molded articles in accordance with the present invention.

Next, methods of manufacturing the biodegradable plastic molded articles in accordance with the present invention will be illustrated.

Usually, coconut powders and fertilizer powders are solvently mulled in biodegradable plastics within the range of the adding ratio according to the present invention, and pelletized. When at least one component selected from the group consisting of surfactants, stains, and agricultural chemicals is added into the biodegradable plastic molded articles in accordance with the present invention, the component may be added into the biodegradable plastics together with the coconut powders and the fertilizer powders within the range of the adding ratio according to the present invention during the above-described solvently mulling. The well known mulling apparatus such as a banbary mixer, Henshel mixer, monoaxial muller, multiaxial muller, mixing roll, and kneader is preferably used for the above-described solvently mulling and pelletizing.

Then, molding is performed using the obtained pellets. Methods for molding are not especially restricted, and the usual methods utilized for molding plastics are employed. Especially, since the biodegradable plastic molded articles in accordance with the present invention have superior biodegradability compared with the conventional ones, molded articles having great thickness in addition to films can be obtained.

When the films are produced, the well known film making apparatus such as the inflation method and T dye method can be employed. Further, a drawing step may be added after the films are produced. Although a thickness of the film is appropriately set according to the required strength and required degradation rate due to the use thereof, it is usually set ranging from 10 to 2000 $\mu$m.

A biodegradable resin layer in which the coconut powders and the fertilizer powders are not added can be laminated or coated on the surfaces of the biodegradable plastic molded articles such as films in accordance with the present invention. In addition, a synthetic resin such as polyolefin, polyester, and polyurethane can be laminated or coated on the surfaces of the films within the range which does not greatly inhibit the above-described biodegradability.

Examples of the molded articles using a injection molding machine, a vacuum forming machine, an extruder, or a blow molding machine are raising seedling pots, piles, ducts, wall materials, platy articles, engineering plastic products, packing materials, agricultural and piscatorial products, daily necessities, agriculture usable products, architectural materials, and the like. These molded articles can be widely used as materials and components for civil engineering, medical use, sport, greening, and others.

The films among the biodegradable plastic molded articles in accordance with the present invention can be widely used as compost bags, greening seeds sacks, garbage bags, shopping bags, a variety of packing films, industrial films, and agricultural films.

For example, when the film is applied to the compost bags, it is useful in solving the environmental problems, because the bags can be treated together with raw garbage and allowed to return to the realm of nature.

BRIEF DESCRIPTION OF THE DRAWINGS

FIG. 1 (A) is a cross-sectional view of a coconut and FIG. 1 (B) is an enlarged cross-sectional view of the coconut fiber.

FIG. 2 is a graphical representation which compares degradation ratios over time of films, fragments of seeding pots, and cellulose powder in Example and Comparative examples. A solid line represents the seeding pots in Example, a dotted line represents the cellulose powder, a dotted chain line represents the films in Comparative example 1, and a two-dotted chain line represents the seeding pots in Comparative example 2.

BEST MODE FOR CARRYING OUT THE INVENTION

The present invention will be more concretely described with reference to the examples below.

PRODUCTION EXAMPLE

After mesocarp and albumen were removed from coconut, the remaining mesocarp was exposed to freshwater for one year to dissolve and remove pulpy substances, so that the fiber fraction was collected. The obtained fibers were exposed to sunlight for three years so as to remove salts and tannin included therein. An artificial drying with hot air at a temperature of 105° C. was conducted for eight hours so as to reduce a water content to 10% by weight. Then, fine fragments with a length ranging from 5 to 10 mm, being generated during the production of nets with fibers, were collected. The fine fragments were compressed at a compression ratio of 6:1 using a pressing machine. After the obtained compressed substances were crushed by a jet mill and classified using a screen, coconut powders which passed through a 400 mesh screen were obtained. The coconut powders were subjected to the artificial drying with hot air at a temperature of 70° C. for eight hours, so that the water content was decreased to 2% by weight. When the obtained coconut powders were observed with a scanning electron microscope, an average particle diameter was confirmed to be about 20 $\mu$m.

EXAMPLE

Biodegradable aliphatic polyester which was produced by combined with glycol and aliphatic carboxylic acid at a ratio of 30:70 by weight, respectively (Bionole(r), manufactured by SHOWA KOUBUNSHI Co. LTD.) at 90% by weight, the coconut powders obtained in the above Production example at 7% by weight, and fertilizer powders (nitrogen: phosphoric acid : potassium =6:38:6, GreenmapII(r), manufactured by Nihon Godohiryo K. K., delivered by Sunscreen K. K.) at 3% by weight were mixed, melted and mixed, and granulated, so that a material for biodegradable plastic molded articles was obtained.

The above-described material was molded to raising seedling pots with a thickness of 500 μm using an injection molding machine at a processing temperature of 150° C.

COMPARATIVE EXAMPLE 1

The same biodegradable aliphatic polyester as that in the example at 95% by weight and the coconut powders obtained in the above Production example at 5% by weight were mixed, melted and mixed, and granulated, so that a material for biodegradable plastic molded articles was obtained.

The above-described material was molded to bag shaped films with a thickness of 45 μm using a inflation extruder having a diameter of 65 at a processing temperature of 160° C.

COMPARATIVE EXAMPLE 2

The same biodegradable aliphatic polyester as that in the example at 95% by weight and the coconut powders obtained in the above Production example at 5% by weight were mixed, melted and mixed, and granulated, so that a material for biodegradable plastic molded articles was obtained.

The above-described material was molded to raising seedling pots with a thickness of 500 μm using an injection molding machine at a processing temperature of 150° C.

Assessment of Biodegradability

The seedling pots (100 g) in the example, the films (60 g) in Comparative example 1, the fragments of the seedling pots (100 g) in Comparative example 2, or cellulose powder (100 g) was mixed with 1200 g of soil including leaf soil under the optimum oxygen concentration, temperature, and moisture. These were put into test tubes, allowed to stand at 58° C, and assessed the biodegradability thereof over time (according to a method in ISO DIS 14855). That is, production ratios of carbon dioxide and cumulative volumes thereof were monitored for 45 days. Biodegradation ratios thereof were calculated based on the solid carbon amounts of the test substances which were converted into the amounts of carbon dioxide. The results are shown in FIG. 2.

As shown by these results, the seedling pots of the present Example had a higher biodegradation rate than the films or the seedling pots of Comparative examples which had no fertilizer powders, and showed higher biodegradation rate than the cellulose powder did in about three weeks later. The degradation ratios of the pots were about 80% and about 90% on the 25th day and the 35th day, respectively.

The seedling pots in the example had sufficient physical strength at the initial time of the biodegradation test.

INDUSTRIAL APPLICABILITY

Since biodegradable plastic molded articles in accordance with the present invention have superior biodegradability, they are degraded and disappear at an early stage, so that they are effective in solving the waste problems.

What is claimed is:

1. A biodegradable plastic article molded of a mixture comprising the following components:
   (A) a biodegradable plastic at 98 to 59% by weight,
   (B) a dry powder of a water-swelling fiber at 1 to 40% by weight, and
   (C) a fertilizer powder at 1 to 40% by weight
   (wherein the sum of (B) and (C) is from 2 to 41% by weight).

2. A biodegradable plastic article as claimed in claim 1, wherein the dry powder of a water-swelling fiber is a dry powder of a coconut mesocarp fiber residue.

3. A biodegradable plastic article as claimed in claim 1 or claim 2, wherein the dry powder of the coconut mesocarp fiber residue is obtained by drying the fiber residue to a water content of about 10% by weight in which the residue is derived from a fiber component of the coconut mesocarp and a contaminant including a salt and a tannin is essentially removed, by compressing into a powder having a particle diameter ranging from 1 to 80 micron, and by drying to a water content of less than 3% by weight.

4. A biodegradable plastic article as claimed in any one of claims 1 to 3, wherein the biodegradable plastic is selected form the group consisting of an aliphatic polyester, macro-molecular polysaccharides, and a microbial polyester.

5. A biodegradable plastic article as claimed in any one of claims 1 to 4, wherein the fertilizer is selected form the group consisting of a nitrogenous fertilizer, a phosphate fertilizer, a potassium fertilizer, and a fertilizer including a diatomaceous.

6. A biodegradable plastic article molded of a mixture comprising the following components:
   (A) a biodegradable plastic at 97 to 58% by weight,
   (B) a dry powder of a water-swelling fiber at 1 to 40% by weight,
   (C) a fertilizer powder at 1 to 40% by weight, and
   (D) a component selected from the group consisting of a surfactant, a pigment, and a pesticide at 1 to 10% by weight
   wherein the sum of (B), (C), and (D) is from 3 to 42% by weight.

7. A biodegradable plastic article as claimed in claim 6, wherein the dry powder of a water-swelling fiber is a dry powder of a coconut mesocarp fiber residue.

8. A biodegradable plastic article as claimed in claim 6 or claim 7, wherein the dry powder of the coconut mesocarp fiber residue is a powder obtained by drying the fiber residue to a water content of about 10% by weight in which the residue is derived from a fiber component of the coconut mesocarp and a contaminant including a salt and a tannin is essentially removed, by compressing into a powder having a particle diameter ranging from 1 to 80 micron, and by drying to a water content of less than 3% by weight.

9. A biodegradable plastic article as claimed in any one of claims 6 to 8, wherein the biodegradable plastic is selected from the group consisting of an aliphatic polyester, a macromolecular polysaccharide, and a microbial polyester.

10. A biodegradable plastic article as claimed in any one of claims 6 to 9, wherein the fertilizer is selected from the group consisting of a nitrogenous fertilizer, a phosphate fertilizer, a potassium fertilizer, and a fertilizer including a diatomaceous.

* * * * *